US007690197B2

(12) United States Patent
Smith

(10) Patent No.: US 7,690,197 B2
(45) Date of Patent: Apr. 6, 2010

(54) HYDRAULIC FLUID COOLING APPARATUS AND METHOD

(75) Inventor: Norman John Smith, Kurwongbah (AU)

(73) Assignee: Titan Research and Innovations Pty Ltd, Glen Waverly, Victoria (AU)

( * ) Notice: Subject to any disclaimer, the term of this patent is extended or adjusted under 35 U.S.C. 154(b) by 111 days.

(21) Appl. No.: 11/795,895

(22) PCT Filed: Jan. 30, 2006

(86) PCT No.: PCT/AU2006/000105

§ 371 (c)(1),
(2), (4) Date: Jul. 24, 2007

(87) PCT Pub. No.: WO2006/079178

PCT Pub. Date: Aug. 3, 2006

(65) Prior Publication Data

US 2008/0163619 A1 Jul. 10, 2008

(30) Foreign Application Priority Data

Jan. 28, 2005 (AU) .............................. 2005900356
Oct. 24, 2005 (AU) .............................. 2005905874

(51) Int. Cl.
*F16D 31/02* (2006.01)

(52) U.S. Cl. .......................................... 60/456; 60/464

(58) Field of Classification Search .................. 60/456, 60/464, 488
See application file for complete search history.

(56) References Cited

U.S. PATENT DOCUMENTS 3,222,865 A * 12/1965 Miller ......................... 60/456
3,543,844 A * 12/1970 Jordan et al. ................ 165/155
5,317,872 A 6/1994 Ingvast
5,709,085 A 1/1998 Herbig

FOREIGN PATENT DOCUMENTS

DE 3500310 A1 7/1986
JP 10-061617 A 3/1998
SU 1609611 A 11/1990

* cited by examiner

*Primary Examiner*—Michael Leslie
(74) *Attorney, Agent, or Firm*—Hoffman, Wasson & Gitler

(57) ABSTRACT

A hydraulic drive apparatus comprises a main pump for pumping hydraulic fluid through a hydraulic load, a charge pump for continuously pumping pressurized hydraulic fluid to the main pump, and a hydraulic fluid cooler. At least a portion to the hydraulic fluid pumped through the hydraulic load is returned under pressure to the charge pump and the charge pump pumps the pressurized hydraulic fluid through the hydraulic fluid cooler to the main pump.

12 Claims, 1 Drawing Sheet

HYDRAULIC FLUID COOLING APPARATUS AND METHOD

FIELD OF THE INVENTION

Figure 1:
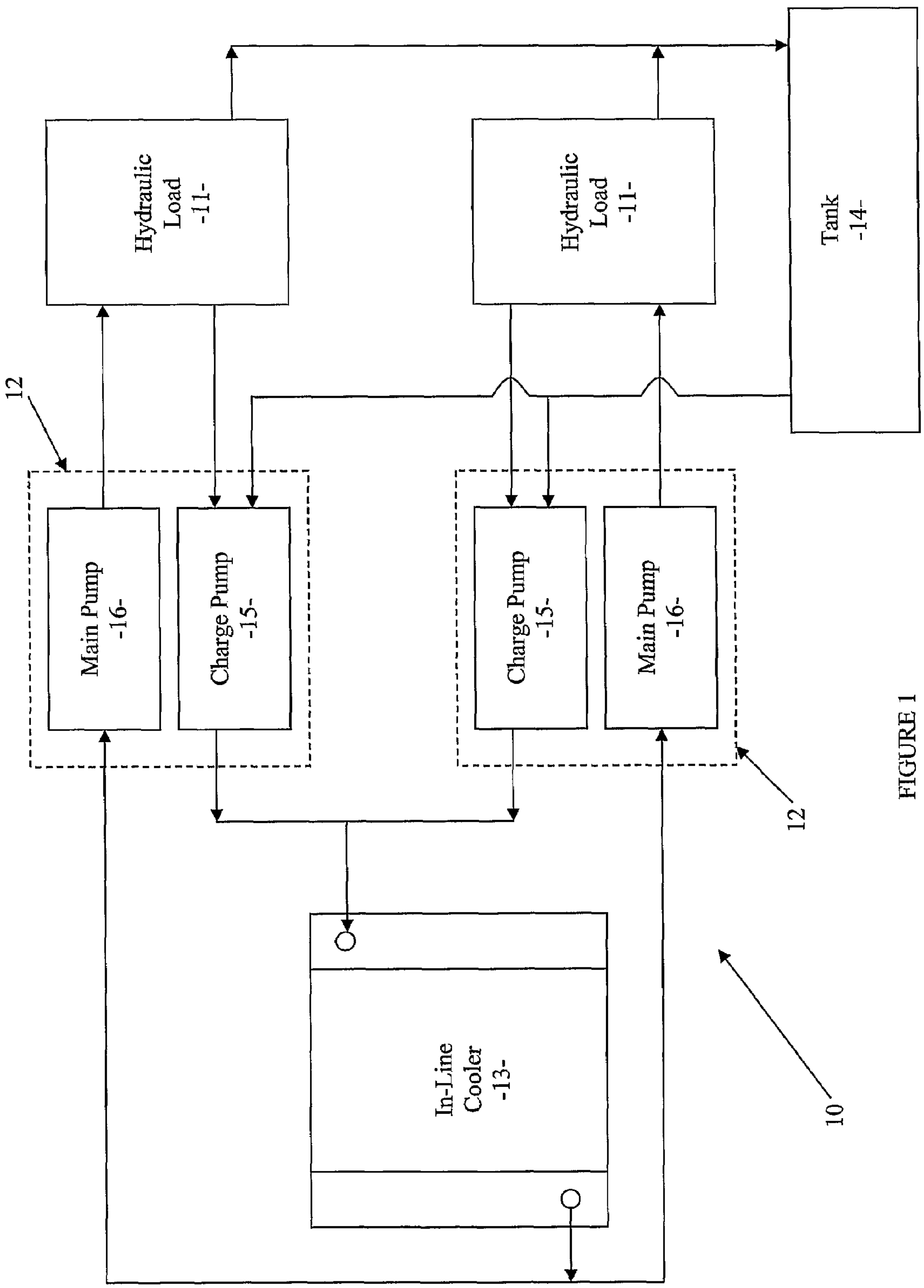

The present invention relates generally to hydraulic apparatus and, in particular, to hydraulic apparatus which require cooled hydraulic fluid for circulating through the apparatus.

Although the invention will be described with particular reference to hydrostatic drive apparatus it will be appreciated that this is by way of example only and that the invention may be used in relation to other hydraulic drive apparatus.

BRIEF DISCUSSION OF THE PRIOR ART

Various types of plant and equipment such as earthmoving machines include hydraulic apparatus which are in the form of hydrostatic drive apparatus. The ability of these drive apparatus to operate under sustained loads in relatively high ambient temperatures such as 22° C. and above has traditionally been limited by their ability to adequately cool the hydraulic fluid which circulates through them.

In full-flow hydraulic system hydrostatic drive apparatus, power is transmitted from a hydraulic pump to a hydraulic motor by hydraulic fluid. Once the hydraulic fluid has transmitted the power from the pump to the motor, the hydraulic fluid is exhausted from the motor through a hydraulic fluid cooler and returned to a supply tank or reservoir where it is held until required again.

In closed-loop hydrostatic drive apparatus, the hydraulic fluid circulates through a hydraulic circuit which is similar to the above-described hydraulic circuit of a full-flow type hydrostatic drive apparatus. However, closed-loop hydrostatic drive apparatus also include a charge pump which reintroduces cooled hydraulic fluid in the reservoir back into the high pressure section of the hydraulic circuit to replace hydraulic fluid which is syphoned off from the motor case drains, internal lubrication circuits and the like in the high pressure circuit, and which is returned to the reservoir via the hydraulic fluid cooler.

The hydraulic fluid of hydrostatic drive apparatus such as those described above is heated when external induced loads are applied to these apparatus. The heat which is generated is proportional to the load so that the greater the load the greater the heat generated for a hydraulic apparatus of a particular design.

A problem with conventional closed-loop hydrostatic drive apparatus of the type described above is that the hydraulic fluid retained in the apparatus which has already passed through the high pressure section of the hydraulic circuit of the apparatus once and not discharged through motor case drains, internal lubrication circuits and the like, must then pass through that section again with the retained heat from the previous pass. Thus, the fluid being re-introduced into the high pressure hydraulic circuit by the charge pump from the tank gets continually hotter as the apparatus operates. As this happens, the ability of the hydraulic apparatus to perform to expectations is greatly diminished.

For example, if a closed-loop hydrostatic drive apparatus is designed to transmit 100 kilowatts of power, and the external or induced load causes an intermittent power demand of 120 kilowatts which is met by increasing the pressure in the high pressure section of the apparatus' hydraulic circuit, the temperature of the hydraulic fluid in the apparatus rises above its normal operating or "plateau" temperature. This increased temperature of the hydraulic fluid diminishes the performance of the apparatus and can only be reduced by stopping the operation of the apparatus for a sufficient period of time or by operating the apparatus for a relatively prolonged period of time at a load demand which is well below the 100 kilowatts which the apparatus is designed to transmit.

The tank of either a full-flow or conventional closed-loop hydrostatic drive apparatus which is designed to transmit a certain amount of power must have a capacity which is able to hold a sufficient amount of hydraulic fluid to prevent the temperature of the hydraulic fluid from exceeding its normal operating temperature when the drive apparatus is operated to continuously transmit the amount of power which the apparatus is designed to transmit. If the apparatus does not include return fluid cooling such as is provided by the fluid coolers of the drive apparatus described earlier, the capacity of the tank of the apparatus must be increased to compensate for this. Regardless of whether or not the drive apparatus includes return fluid cooling, the capacity of the tank which is required in order to provide adequate cooling will usually be very large for a full-flow circuit and a slightly smaller for a conventional closed loop circuit design. In high power and high load applications, the tank capacity which is required to provide adequate cooling is usually so large that it is not feasible to have a tank of the required capacity.

German patent document no. 3500310A1 (Mannesmann Rexroth GmbH), Japanese patent document no. 10-061617A (Taihei Dengiyou KK), Derwent abstract accession no. 91-229151/31 (Krasd Mach Tool), and U.S. Pat. Nos. 5,317,872A (Ingvast) and 5,709,085A (Herbig) all disclose hydraulic apparatus which include various forms of "off-line cooling" which attempt to provide some cooled hydraulic fluid to a main hydraulic circuit when necessary. Unlike the other prior art documents, the apparatus disclosed by the Rexroth document includes a "boost pump" to make up for a supply short fall of hydraulic fluid during high intermittent circuit demand.

It would therefore be desirable to reduce the hydraulic fluid tank capacity of hydrostatic drive apparatus such as those described above without reducing the performance of the apparatus.

SUMMARY OF THE INVENTION

It is an object of the present invention to overcome, or at least ameliorate, one or more of the deficiencies of the prior art mentioned above, or to provide the consumer with a useful or commercial choice.

Other objects and advantages of the present invention will become apparent from the following description, taken in connection with the accompanying illustrations, wherein, by way of illustration and example, a preferred embodiment of the present invention is disclosed.

According to a first broad aspect of the present invention there is provided a hydraulic drive apparatus comprising a main pump for pumping hydraulic fluid through a hydraulic load, a charge pump for continuously pumping pressurized hydraulic fluid to the main pump, and a hydraulic fluid cooler, wherein at least a portion of the hydraulic fluid pumped through the hydraulic load is returned under pressure to the charge pump and the charge pump pumps the pressurized hydraulic fluid through the hydraulic fluid cooler to the main pump.

The fluid cooler, positioned between the charge pump and the main pump is able to provide the main pump with a continuous source of sufficiently cooled fluid under conditions of overload for extended periods in relatively high ambient temperatures such as, for example, temperatures up to 52° C. Thus, the hydraulic fluid is able to be cooled within the main closed circuit loop of the apparatus which includes the fluid cooler and the charge and main pumps, and does not need to be cooled off-line.

The hydraulic drive apparatus may be any suitable hydraulic drive apparatus. Preferably, the hydraulic drive apparatus is in the form of a hydrostatic drive apparatus for driving a plurality of hydraulic motors.

The charge pump of the apparatus may be provided by any suitable pump. The charge pump may be designed to operate up to any desired maximum pressure. Preferably, the charge pump is designed to operate at pressures of up to 69 bar (1,000 psi). In a particular preferred form, the charge pump is designed to operate at maximum pressures of 35 to 45 bar (500 to 650 psi).

Preferably, the pressure of the hydraulic fluid between the charge pump and the main pump is relatively constant. This allows for more reliable performance of a suitably designed fluid cooler.

The fluid cooling may be provided by any hydraulic fluid cooler which is able to adequately cool the hydraulic fluid as it is pumped from the charge pump to the main pump, and which is able to operate at the high pressures which are generated between the charge pump and the main pump of the apparatus. The hydraulic fluid cooler is preferably a fluid cooling radiator. If the hydraulic fluid cooler is a fluid cooling radiator it is preferred that the radiator is a multiple pass radiator. In a preferred form, the hydraulic fluid cooler is substantially constructed from an aluminum alloy. The hydraulic fluid cooler may be designed to operate up to any desired maximum pressure. Preferably, the fluid cooler is designed to operate at pressures of up to 70 bar (1015 psi). In a particular preferred form, the fluid cooler is designed to operate at minimum pressures of 35 to 45 bar (500 to 650 psi). The design of the fluid cooler is preferably such as to balance the heat rejection capacity of the cooler with the heat generated in the hydraulic fluid by the apparatus so that a predetermined amount of the heat is able to be removed from the fluid as the fluid passes through the fluid cooler.

The main pump of the apparatus may be provided by any suitable variable flow pump. The main pump may be designed to operate up to any desired maximum pressure. Preferably, the main pump is designed to operate at pressures of up to 310 bar (4500 psi). In a particular preferred form, the main pump is designed to operate at maximum pressures of 262 to 310 bar (3800 to 4500 psi).

The charge pump and the main pump preferably form part of a hydraulic fluid pump assembly.

The hydraulic drive apparatus may include a plurality of charge pumps, main pumps or hydraulic fluid coolers. In the preferred embodiment, the hydraulic drive apparatus includes a pair of hydraulic fluid pump assemblies and a single hydraulic fluid cooler.

In many hydraulic motors or pumps or other hydraulic loads, a portion of the hydraulic fluid which is pumped through the load is used for lubrication and may be syphoned off from case drains or internal lubrication circuits and the like. It is preferred that the hydraulic drive apparatus includes a tank for holding collected or excess hydraulic fluid. Preferably, the charge pump also draws hydraulic fluid from the tank and pumps drawn hydraulic fluid with the pressurized hydraulic fluid to the hydraulic fluid cooler.

The main pump preferably pumps hydraulic fluid to a load such as a hydraulic motor or another hydraulic pump.

The charge pump preferably draws on hydraulic fluid which is exhausted from a load such as a hydraulic motor or another hydraulic pump.

To make the apparatus particularly suited for use in cooler climates, the temperature of the hydraulic fluid in the apparatus may be controlled thermostatically.

According to a second broad aspect of the present invention there is provided a method of cooling hydraulic fluid in a hydraulic drive apparatus comprising a main pump for pumping hydraulic fluid to a hydraulic load, a charge pump for continuously pumping hydraulic fluid to the main pump and a hydraulic fluid cooler, the method comprising the steps of:

(i) returning at least a portion of the hydraulic fluid pumped through the hydraulic load to the charge pump under pressure; and (ii) pumping the hydraulic fluid through the hydraulic fluid cooler to the main pump.

The hydraulic fluid cooler may be provided by any hydraulic fluid cooler which is able to adequately cool the hydraulic fluid as it is pumped from the charge pump to the main pump, and which is able to operate at the high pressures which are generated between the charge pump and the main pump of the apparatus. The hydraulic fluid cooler is preferably a fluid cooling radiator which is preferably a multiple pass radiator. In a preferred form, the hydraulic fluid cooler is substantially constructed from an aluminum alloy. The hydraulic fluid cooler may be designed to operate up to any desired maximum pressure. Preferably, the hydraulic fluid cooler is designed to operate at pressures of up to 70 bar (1015 psi). In a particular preferred form, the hydraulic fluid cooler is designed to operate at maximum pressures of 35 to 40 bar (500 to 650 psi).

A portion of the hydraulic fluid which is pumped through the load may be used for lubrication and may be syphoned off from case drains or internal lubrication circuits and the like. The apparatus may include a tank for holding collected or excess hydraulic fluid. Preferably, the charge pump also draws hydraulic fluid from the tank and pumps drawn hydraulic fluid with the pressurized hydraulic fluid to the hydraulic fluid cooler.

BRIEF DESCRIPTION OF THE ILLUSTRATIONS

In order that the invention may be more fully understood and put into practice, a preferred embodiment thereof will now be described with reference to FIG. 1 of the accompanying illustration which depicts a schematic diagram of a hydraulic drive apparatus according to the preferred embodiment.

DETAILED DESCRIPTION OF THE ILLUSTRATIONS

A hydraulic apparatus in the form of a hydrostatic drive apparatus 10 according to the preferred embodiment of the present invention is depicted in FIG. 1. The hydrostatic drive apparatus 10 drives a plurality of hydraulic motors 11.

Apparatus 10 comprises a pair of hydraulic fluid pump assemblies 12, a hydraulic fluid cooler 13, and a hydraulic fluid tank or reservoir 14.

Each pump assembly 12 includes a charge pump 15 and a main pump 16. A first inlet of each charge pump 15 is connected to an outlet of the tank 14 so that each charge pump 15 is able to draw low pressure hydraulic fluid which is held in the tank 14 through the outlet of the tank 14. An outlet of each charge pump 15 is connected to an inlet of the fluid cooler 13 so that each charge pump 15 is able to pump high pressure hydraulic fluid to the inlet of the fluid cooler 13 and through the cooler 13.

Fluid cooler 13 also includes an outlet which is connected to an inlet of the main pump 16 of each pump assembly 12 so that high pressure hydraulic fluid which flows from the outlet of the cooler 13 is able to flow to the inlet of each main pump 16. Fluid cooler 13 is in the form of a fluid cooling radiator.

An outlet of each main pump 16 is connected to an inlet of a respective hydraulic motor 11 so that high pressure hydraulic fluid is able to be pumped to each motor 11 by the main pumps 16.

An outlet of each hydraulic motor 11 is connected to a second inlet of the charge pump 15 of a respective pump assembly 12 so that low pressure hydraulic fluid which is exhausted by the motors 11 is able to flow to the second inlets of the charge pumps 15. The charge pumps 15 are then able to reintroduce the exhaust fluid into the high pressure section of the apparatus 10 which commences at the outlets of the charge pumps 15 and finishes at the outlets of the hydraulic motors 11.

A drainage outlet of each hydraulic motor 11 is connected to the tank 14 so that hydraulic fluid which is drained rather than exhausted from the hydraulic motors 11 is able to flow into the tank 14. The hydraulic fluid which is drained from the hydraulic motors 11 may, for example, be hydraulic fluid which is syphoned off from case drains or internal lubrication circuits of the motors.

Fluid cooler 13 is a multiple pass fluid cooling radiator which is made from an aluminum alloy and which is designed to cool the high pressure hydraulic fluid which passes through it by a sufficient amount to maintain the fluid in the high pressure section of the apparatus 10 at an optimum temperature to maintain the performance of the apparatus 10.

It is believed that the design of the apparatus 10 is both compact and efficient, and that it allows the use of hydraulic principles to transmit power far more efficiently than conventional mechanical methods currently employed such as gearboxes and mechanical drive lines.

Throughout the specification and the claims, unless the context requires otherwise, the term "comprise", or variations such as "comprises" or "comprising", will be understood to apply the inclusion of the stated integer or group of integers but not the exclusion of any other integer or group of integers.

Throughout the specification and claims, unless the context requires otherwise, the term "substantially" or "about" will be understood to not be limited to the value for the range qualified by the terms.

It will be appreciated by those skilled in the art that variations and modifications to the invention described herein will be apparent without departing from the spirit and scope thereof. The variations and modifications as would be apparent to persons skilled in the art are deemed to fall within the broad scope and ambit of the invention as herein set forth.

It will be clearly understood that, if a prior art publication is referred to herein, that reference does not constitute an admission that the publication forms part of the common general knowledge in the art in Australia or in any other country.

What is claimed is:

1. A hydraulic drive apparatus comprises a main pump for pumping hydraulic fluid through a hydraulic load, a charge pump for continuously pumping pressurized hydraulic fluid to the main pump, and a hydraulic fluid cooler, wherein at least a portion of the hydraulic fluid pumped through the hydraulic load is returned under pressure to the charge pump and the charge pump pumps the pressurized hydraulic fluid through the hydraulic fluid cooler to the main pump.

2. The hydraulic drive apparatus of claim 1, wherein the hydraulic drive apparatus is a hydrostatic drive apparatus.

3. The hydraulic apparatus of claim 1, wherein the pressure of the hydraulic fluid between the charge pump and the main pump is constant.

4. The hydraulic apparatus of claim 1, wherein the hydraulic fluid cooler is a fluid cooling radiator.

5. The hydraulic apparatus of claim 4, wherein the fluid cooling radiator is a multiple pass radiator.

6. The hydraulic apparatus of claim 1, wherein the hydraulic fluid cooler is substantially constructed from an aluminum alloy.

7. The hydraulic apparatus of claim 1, wherein the charge pump and the main pump form part of a hydraulic fluid pump assembly.

8. The hydraulic apparatus of claim 1, wherein the hydraulic apparatus also comprises a tank for holding hydraulic fluid which is collected from the main pump, charge pump or the hydraulic fluid cooler.

9. The hydraulic apparatus of claim 8, wherein the charge pump draws hydraulic fluid from the tank and pumps drawn hydraulic fluid with the pressurized hydraulic fluid to the hydraulic fluid cooler.

10. The hydraulic apparatus of claim 1, wherein the main pump pumps hydraulic fluid to a hydraulic motor.

11. The hydraulic apparatus of claim 1, wherein the charge pump draws on hydraulic fluid which is exhausted from a hydraulic motor.

12. A method of cooling hydraulic fluid in a hydraulic drive apparatus comprising a main pump for pumping hydraulic fluid to a hydraulic load, a charge pump for continuously pumping hydraulic fluid to the main pump and a hydraulic fluid cooler, the method comprising the steps of:

(i) returning at least a portion of the hydraulic fluid pumped through the hydraulic load to the charge pump under pressure; and (ii) pumping the hydraulic fluid through the hydraulic fluid cooler to the main pump.

* * * * *